United States Patent

Obata et al.

Patent Number: 5,571,419
Date of Patent: Nov. 5, 1996

[54] METHOD OF PRODUCING PURE WATER

[75] Inventors: Yoshinobu Obata; Nobuhiro Orita; Hiroshi Kurobe, all of Tokyo, Japan

[73] Assignee: Kurita Water Insustries Ltd., Tokyo, Japan

[21] Appl. No.: 302,806

[22] PCT Filed: Feb. 3, 1994

[86] PCT No.: PCT/JP94/00152

§ 371 Date: Oct. 6, 1994

§ 102(e) Date: Oct. 6, 1994

[87] PCT Pub. No.: WO94/18127

PCT Pub. Date: Aug. 18, 1994

[30] Foreign Application Priority Data

Feb. 3, 1993 [JP] Japan .......... 5-16281

[51] Int. Cl.$^6$ ............ C02F 1/42
[52] U.S. Cl. ............ 210/664; 210/668; 210/669; 210/683; 210/686; 210/687; 210/750; 210/759; 210/763; 210/766; 210/900; 210/915
[58] Field of Search ............ 210/900, 915, 210/758, 759, 760, 762, 763, 188, 663, 664, 665, 668, 669, 683, 684, 685, 686, 750, 761, 766, 687

[56] References Cited

U.S. PATENT DOCUMENTS

| | | | |
|---|---|---|---|
| 3,870,033 | 3/1975 | Faylor et al. | 210/669 |
| 4,280,914 | 7/1981 | Knorre et al. | 210/759 |
| 4,416,786 | 11/1983 | Knorre et al. | 210/746 |
| 4,594,170 | 6/1986 | Brown et al. | 210/759 |
| 4,595,498 | 6/1986 | Cohen et al. | 210/192 |
| 4,655,929 | 4/1987 | Tanaka et al. | 210/664 |
| 4,751,005 | 6/1988 | Mitsui et al. | 210/759 |
| 4,767,543 | 8/1988 | Chornet et al. | 210/759 |
| 4,792,407 | 12/1988 | Zeff et al. | 210/759 |
| 4,861,484 | 8/1989 | Lichtin et al. | 210/759 |
| 4,863,608 | 9/1989 | Kawai et al. | 210/638 |
| 4,879,041 | 11/1989 | Kurokawa et al. | 210/640 |
| 4,990,260 | 2/1991 | Pisani | 210/664 |
| 5,043,072 | 8/1991 | Hitotsuyanagi et al. | 210/915 |
| 5,061,374 | 10/1991 | Lewis | 210/668 |
| 5,073,268 | 12/1991 | Saito et al. | 210/638 |
| 5,106,513 | 4/1992 | Hong | 210/759 |
| 5,124,033 | 6/1992 | Ohmi et al. | 210/181 |
| 5,141,717 | 8/1992 | McRae | 210/746 |
| 5,232,604 | 8/1993 | Swallow et al. | 210/758 |
| 5,246,586 | 9/1993 | Ban et al. | 210/638 |
| 5,250,183 | 10/1993 | Sawada et al. | 210/750 |
| 5,259,972 | 11/1993 | Miyamaru et al. | 210/900 |
| 5,356,539 | 10/1994 | Peter et al. | 210/668 |
| 5,385,664 | 1/1995 | Oinuma et al. | 210/151 |
| 5,422,013 | 6/1995 | Hirofuji | 210/739 |

FOREIGN PATENT DOCUMENTS

| | | |
|---|---|---|
| 149799 | 7/1981 | Germany. |
| 55-48876 | 12/1980 | Japan. |
| 2-17994 | 1/1990 | Japan. |
| 5-57300 | 3/1993 | Japan. |

Primary Examiner—Cynthia L. Nessler
Attorney, Agent, or Firm—Kanesaka & Takeuchi

[57] ABSTRACT

Raw water is made acidic so that the pH is not more than 4.5 and heated in the presence of an oxidizing agent to decompose TOC components in the raw water, and then deionized, thereby producing ultrapure water having a greatly low concentration of organic matters.

6 Claims, 8 Drawing Sheets

METHOD OF PRODUCING PURE WATER

TECHNICAL FIELD

The present invention relates to a method of producing pure water (deionized water including ultrapure water) and, more particularly, to a method of producing ultrapure water which can greatly reduce TOC (total organic carbon) in the pure water than a conventional method.

BACKGROUND ART

I. A conventional water purifying apparatus for producing ultrapure water from raw water such as city water, well water and industrial water is composed of a pretreatment equipment, a primary pure water equipment and secondary pure water equipment. The pretreatment equipment is composed of coagulation, floatation and filtration units. The primary pure water equipment is composed of two reverse osmosis membrane units and a mixed bed ion exchange unit, or a demineralization equipment and a reverse osmosis membrane unit. The secondary pure water equipment is composed of a low pressure mercury ultraviolet oxidization unit, a demineralization equipment and an ultrafilter (ultrafiltration membrane separation device).

Either the following process (i) or (ii) is adopted.

(i) Raw water→coagulation, floatation, filtration units→ first reverse osmosis membrane unit→second reverse osmosis membranes unit→mixed bed ion exchange unit→primary ;pure water storage tank→low pressure mercury ultraviolet oxidization unit→demineralization equipment→ultrafilter→
ultrapure water (ii) Raw water→coagulation, floatation, filtration units→ ion exchange equipment [two-bed three-tower type (cation exchange tower→vacuum degas tower or decarbonation tower→anion exchange tower) or four-bed five tower type (first cation exchange tower→ second anion exchange tower→vacuum degas tower or decarbonation tower→second cation exchange tower→ second anion exchange tower )]→reverse osmosis membrane unit→primary pure water storage tank→ low pressure mercury ultraviolet oxidization unit→ mixed bed ion exchange unit→ultrafilter→ultrapure water The above deminerlization equipment comprises an anion exchange column, a mixed bed ion exchange column or an anion exchange column and a mixed bed ion exchange column which are arranged in series.

Among these units and equipments, the reverse osmosis membrane units, the demineralization equipment and the low pressure mercury ultraviolet oxidization unit reduce the TOC components in raw water by separation, adsorption, decomposition or the like.

TOC reducing-mechanisms of these units or equipmemts are as follows.

Reverse osmosis membrane unit: Raw water is filtered through a reverse osmosis membrane so as to remove ionic and colloidal TOC.

Low pressure mercury oxidization unit: TOC is decomposed into an organic acid and further into $CO_2$ by ultraviolet of 185 nm projected from a low pressure mercury ultraviolet lamp. The organic acid produced is removed by an ion exchange resin provided at a subsequent stage. This mechanism is used especially for the decomposition of a volatile organic matter.

The ultrapure water produced by the above-described conventional pure water apparatus, however, still contains about 3 to 5 ppb of TOC.

In order to further reduce the TOC in ultrapure water, the ultrapure water may be treated by a multiplicity of stages of reverse osmosis membrane units and an increase in irradiation of a low pressure mercury ultraviolet unit be considered. It has been confirmed, however, as a result of the studies undertaken by the inventors that neither can further reduce the TOC in ultrapure water because of the following reasons.

Raw water contains a urea component as one of the TOC components. Since the urea component is nonionic, the urea component is impossible to be removed by ion exchange. The urea component is removed at a low rate by a reverse osmosis membrane separation. For example, the urea component removal rate by a high salt rejection type reverse osmosis membrane unit, which is generally used as one of the two reverse osmosis membrane units in a primary pure water purifying equipment is about 60%. In addition, urea cannot be decomposed by a low pressure mercury ultraviolet oxidization unit.

Raw water contains not a little amount of urea, which obstructs the reduction of the TOC in ultrapure water. Since it is difficult to remove urea by a conventional water purifying apparatus, there is a limitation to the reduction of TOC.

For example, the city water of Atsugi City, Kanagawa, Japan contains about 30 ppb of urea. Even after treatment of the city water by the above-mentioned process (ii) which uses two reverse osmosis membrane units as the primary pure water equipment, about 8 ppb of urea is detected in the ultrapure water obtained by a conventional ultra water apparatus. 8 ppb of urea will come to about 1.5 ppb as calculated in terms of TOC. It is about 50% of the TOC components in ultrapure water which contains 3 ppb of TOC.

II. Waste water from a semiconductor rinsing system is treated so as to produce ultrapure water and be used again as semiconductor rinse water.

The properties of the waste water of the semiconductor rinsing system are as follows:

pH: 2 to 4

Acid component: hydrochloric acid, nitric acid, sulfuric acid, hydrofluoric acid

Alkali component: ammonia

TOC: 1 to 3 ppm

[TOC component: isopropyl alcohol, methanol, acetone, surfactant]

$H_2O_2$: about 20 ppm

In order to treat such waste semiconductor rinse water, the process comprising the following steps is adopted.

↓
Second activated carbon adsorption
(Removal of unreacted $H_2O_2$)
↓
Strong anion exchange reisn
↓
Treated water About 90% of TOC components is removed by this process.

This process, however, has the following defects.

(a) Since the amount of TOC in raw water is large (2 to 3 ppm), when $H_2O_2$ in the raw water is removed, slime is produced on the first activated carbon.

(b) The slime produced on the first activated carbon is brought into the reverse osmosis membrane unit, and contaminates the reverse osmosis membrane, thereby making the stable operation of the reverse osmosis membrane equipment difficult.

(c) When a polyamide membrane (PA membrane) which has a high removal rate with respect to alcohol, especially, isopropyl alcohol is used as the membrane of a reverse osmosis membrane unit (RO unit), since the PA membrane has no resistance to free chlorine, it is impossible to add an oxidizing agent such as NaClO to feed water so as to prevent the slime contamination.

(d) If a cellulose acetate membrane (CA membrane) which has resistance to free chlorine is used as the membrane of a reverse osmosis membrane unit, since the alcohol removal rate is low, the load of the UV oxidation unit provided at a subsequent stage is increased, which leads to a rise in the cost.

(e) The water recovery of the apparatus as a whole is low. Since the water recovery of the reverse osmosis unit is 90% at its maximum, the water recovery of the apparatus as a whole is not more than 90%. In other words, the loss is not less than 10%.

(f) If the quality of the raw water at the time of designing the apparatus is deteriorated (increase in TOC), the apparatus cannot be used.

If the quality of the raw water is deteriorated, there is no alternative but to add a high pressure UV lap and a UV oxidation tank. However, since it takes a long time to add a high pressure UV lamp, it is impossible to treat the water instantly.

(g) Since the recovery system is complicated, the maintenance requires much labor.

DISCLOSURE OF THE INVENTION

Accordingly, it is an object of the present invention to solve the above-described problems in the related art and to provide a method of producing pure water which can produce pure water having a greatly reduced TOC concentration by removing the urea component in raw water with efficiency.

It is another object of the present invention to provide a method of producing pure water which can produce pure water having a very low dissolved oxygen concentration.

To achieve these objects, the present inventor carried out the experiments of adding sulfuric acid and an oxidizing agent to urea-containing water and decomposing urea by heat treatment.

The results of the experiments are as follows:

Urea-containing water: The city water of Atsugi City, Kanagawa prefecture, Japan with urea added thereto so that the urea concentration was 500 ppb.

Heating temperature: 135° C., 155° C.

Figure 9:
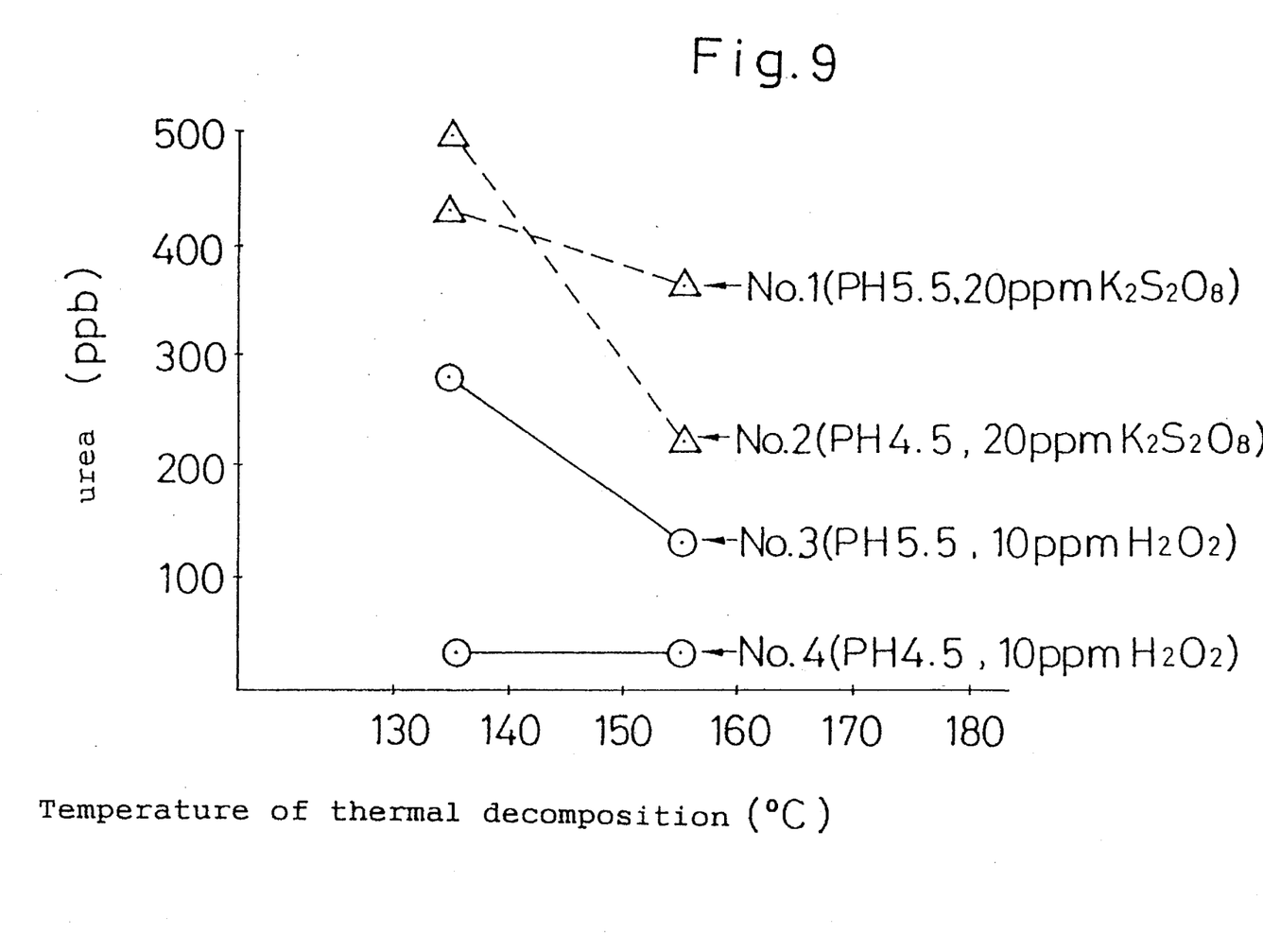
FIG. 9 is a graph showing the result of experiments.

The pH after adding the acid and the type and amount of oxidizing agent are as follows:

No. 1 pH 5.5, 20 ppm of $K_2S_2O_8$
No. 2 pH 4.5, 20 ppm of $K_2S_2O_8$
No. 3 pH 5.5, 10 ppm of $H_2O_2$
No. 4 pH 4.5, 10 ppm of $H_2O_2$ The urea concentration after heating the water is shown in FIG. 9.

FIG. 9 shows the following matter. When the pH of water is adjusted to not more than 4.5, the heat decomposition deficiency is increased, which is apparent from comparison between Nos. 1,3 having the pH of 5.5 and Nos. 2,4 having the pH of 4.5. In each case, the heat decomposition efficiency is increased as the temperature becomes higher.

The method of producing pure water according to the present invention has been invented on the basis of these experiments and various other experiments, wherein raw water is made acidic so that the pH is not more than 4.5 (preferably 2 to 3) and heated in the presence of an oxidizing agent to decompose urea and other TOC components in the raw water, and then aleionized.

As the oxidizing agent, persulfates (e.g., $Na_2S_2O_8$, $K_2S_2O_8$), and oxygen peroxide are usable. Among these, persulfates such as $Na_2S_2O_8$ and $K_2S_2O_8$ are preferable.

The temperature for thermal decomposition is preferably not lower than 110° C., more preferably 120° to 170° C. and the time for decomposition is preferably 2 to 5 minutes. An oxidizing catalyst may be used during heating, but in the case of not using a catalyst the water is preferably held at 130° to 150° C. As the catalyst, platinum held by a carrier is preferable.

According to the method of present invention, it is possible to decompose urea in the raw water with easiness and with efficiency, and to efficiently remove the ions by deionization which are produced by decomposition.

It is therefore possible according to the invention to obtain ultrapure water having a greatly reduced TOC concentration.

When raw water contains hydrofluoric acid, it is preferable to remove hydrofluoric acid by bringing the raw water into contact with a weak basic anion exchange resin.

This is in order to prevent the heat exchanger from being damaged by hydrofluoric acid.

If the pure water after thermal decomposition is deaerated at a high temperature, it is possible to greatly lower the dissolved oxygen concentration in the ultrapure water.

BEST MODE FOR CARRYING OUT THE INVENTION

Preferred embodiments of the present invention will be explained in detail hereinunder with reference to the accompanying drawings.

Figure 1:
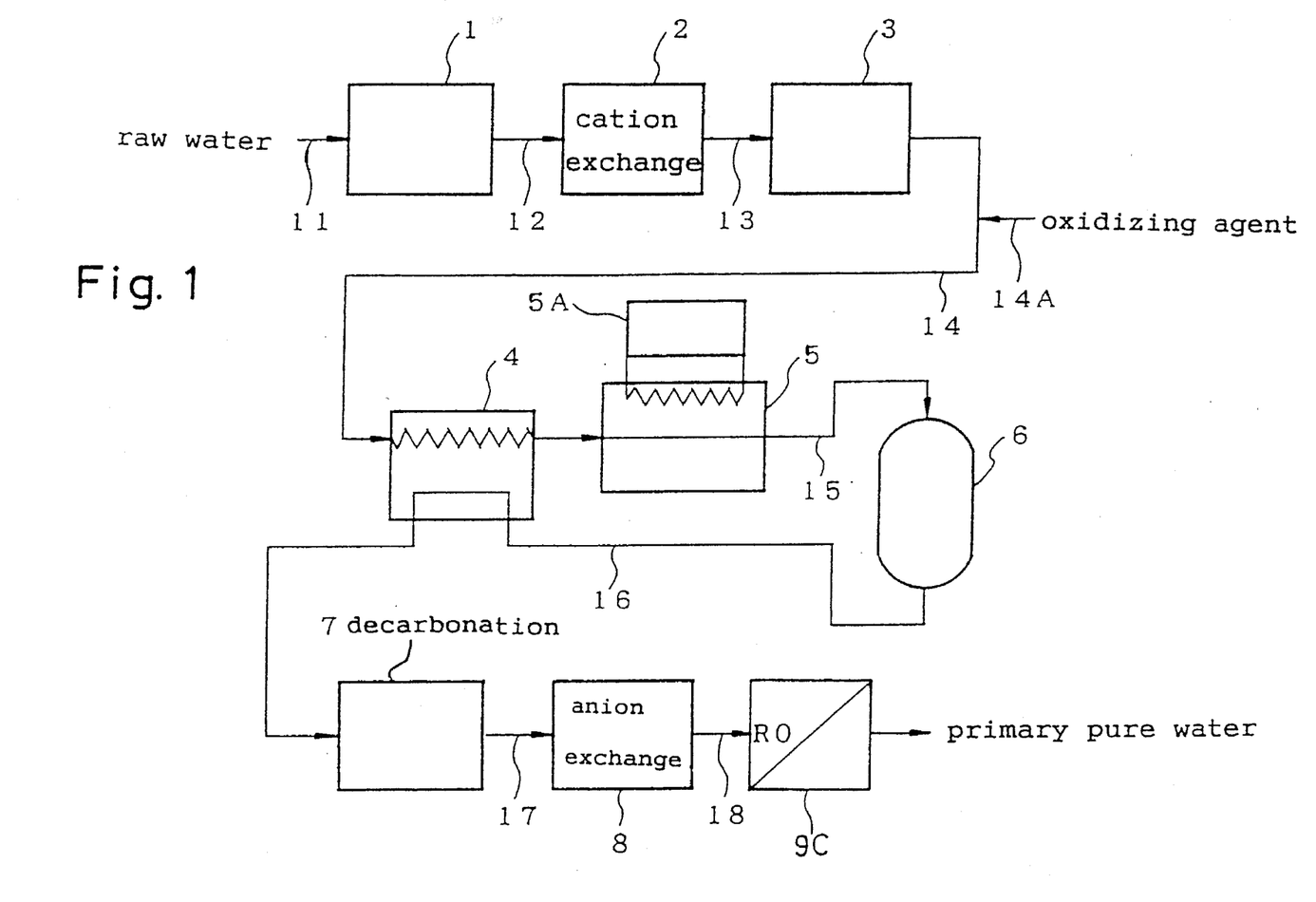
FIG. 1 is a flowchart of an embodiment of a method of producing primary pure water according to the present invention.

FIG. 1 is a flowchart of an embodiment of a method of producing primary pure water according to the present invention.

The method shown in FIG. 1 has an improvement in the before-described process (ii) in the related art. In this embodiment, a thermal decomposition process is inserted between the cation exchange tower and the vacuum gas tower in the two-bed three-tower type ion exchange equipment in the process (ii).

Raw water is first introduced to a coaguration, floatation and filtration units 1 through a pipe 11 and treated, and after the water is introduced to a cation exchange tower 2 through a pipe 12 for the purpose of cation exchange, the water is supplied to an acidic softened water tank 3 through a pipe 13 and stored therein. The pH of the acidic softened water obtained is 3.0. In the process of introducing the water to a heat exchanger 4 through a pipe 14, an oxidizing agent is added to the water through a pipe 14A. The water is heat-exchanged with the treated water of a later-described reaction vessel 6 by the heat exchanger 4, and further heated by a heater 5 provided with a boiler 5A. The water is then introduced to the reaction vessel 6 through a pipe 15. In the reaction vessel 6, urea and other TOC components contained in the water are efficiently decomposed by catalytic heat treatment. The effluent from the reaction vessel 6 is introduced to the heat exchanger 4 through a pipe 16 and after it is heat-exchanged and cooled, it is introduced to a reverse osmosis membrane unit 9c through a decarbonation tower 7, a pipe 17, an anion exchange tower 8 and a pipe 18, so that primary pure water is produced. The primary pure water is supplied to a secondary pure water producing equipment so that almost all of the ions and other components produced by the decomposition are removed.

In the method of the present invention, the thermal decomposition of urea and the like is executed in the presence of an oxidizing agent in the water having the pH of not more than 4.5. If the pH is more than 4.5, the decomposition efficiency is lowered. However, if the pH is too low, the load of the post-treatment increases, so that the pH of the water is preferably about 2 to 3 in an ordinary case.

As the oxidizing agent, persulfates such as hydrogen peroxide ($H_2O_2$) and peroxy potassium disulfide ($K_2S_2O_8$) and the like are usable. The dosage of oxidizing agent such as $H_2O_2$ differs depending upon the TOC of the raw water and the thermal decomposition temperature, but about 10 to 20 mg/l per 1 mg/l of TOC of the raw water is preferable.

When the pH is not more than 3, a persulfate is preferably used as an oxidizing agent. The dosage of persulfate is preferably about 70 mg/l per 1 mg/l of TOC of the raw water.

As the thermal decomposition temperature is made higher, the decompositon efficiency becomes higher and the dosage of oxidizing agent is reduced. From the view point of operation, however, the thermal decomposition temperature is preferably 120° to 170° C., more preferably 130° to 150° C.

In the present invention, the thermal decomposition is preferably catalytic decomposition using a catalyst. In this case, as the catalyst, a platinum catalyst such as platinum held by a carrier and a platinum-plated catalyst is preferable.

The method shown in FIG.1 has the thermal decomposition process applied to the process (ii) in the related art. It is also possible to apply the present invention to the process (i) in the related art. In this case, the thermal decomposition process is inserted before two-stage reverse osmosis process, so that an acid such as sulfuric acid is added to the water treated by the coagulation , floatation and filtration units so as to adjust the pH to not more than 4.5 and the treated water is heated in the presence of an oxidizing agent, and then, the heated water is decomposed by catalytic heat treatment. The effluent is heat-recovered and cooled to an ordinary temperature, and thereafter the water is supplied to the two-stage reverse osmosis membrane process.

In each of these methods, the thermal decomposition treatment is preferably executed in the primary pure water producing equipment.

Figure 2:
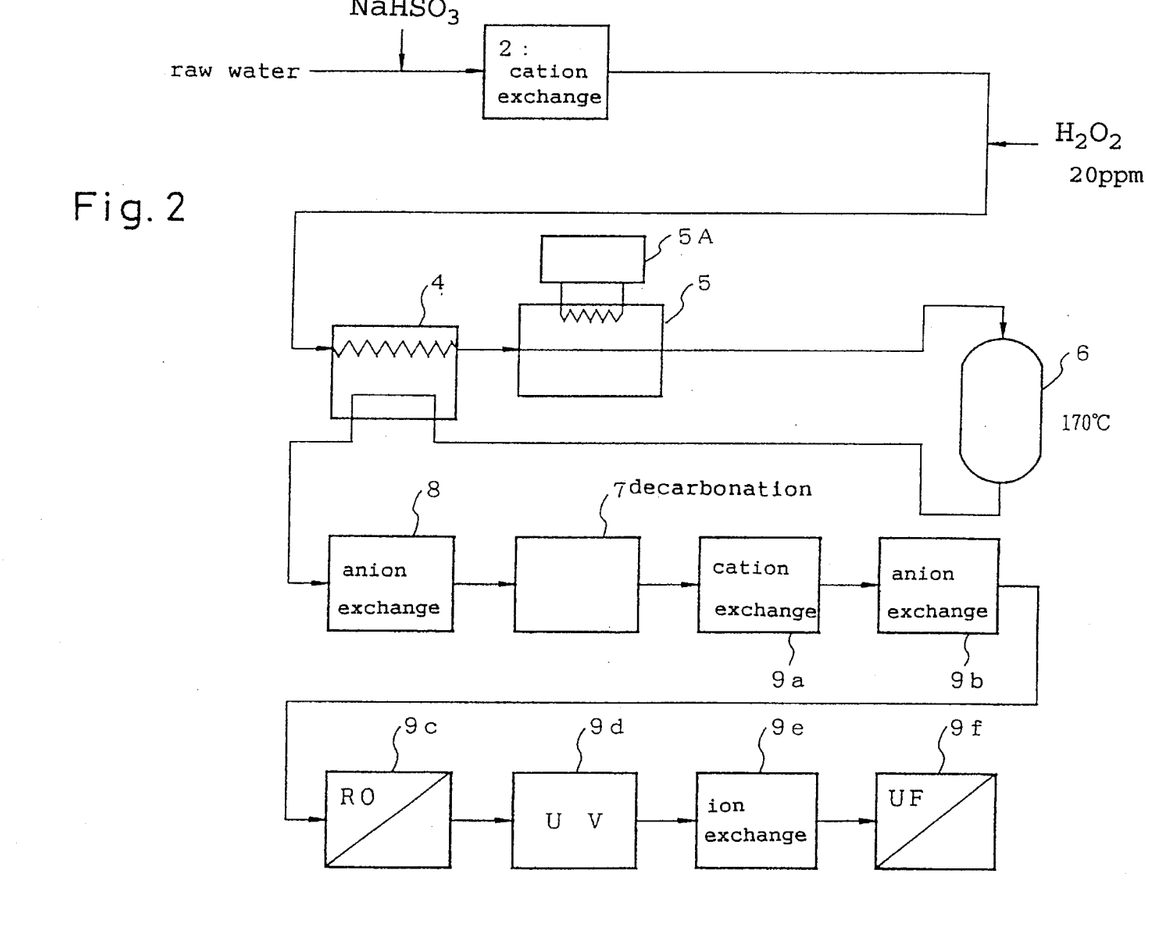
FIG. 2 is a flowchart of an embodiment of a method of producing ultrapure water according to the present invention.

FIG. 2 is a flowchart of another embodiment of the present invention. A reducing agent such as $NaHSO_4$ is added to raw water such as city water so as to remove the remaining chlorine, and treatment by cation exchange tower 2 is executed. After an oxidizing agent such as $H_2O_2$ is added to the water, it is heated by the heat exchanger 4 and the heater 5, and introduced to the reaction vessel 6. The TOC components are decomposed by the reaction vessel 6. The water from the reaction vessel 6 is serially treated by the anion exchange tower 8, the decarbonation tower 7, a cation exchange tower 9a, an anion exchange tower 9b, a reverse osmosis membrane unit 9c, a low pressure mercury ultraviolet oxidization unit 9d for decomposition of an organic matter, a nonregeneration type ion exchanger (mixed bed ion exchange resin column) 9e for removing ions of the organic matter produced by decomposition, and an ultrafiltration membrane separation device 9f for separating the fine particles of the ion exchange resin which flow out of the ion exchanger 9e.

Since the water taken out of the cation exchange tower 2 has a pH of not more than 4.5 due to the cation exchange treatment, it is not necessary to add an acid thereto.

Example 1 shows an example of the operation of the apparatus shown in FIG. 2.

EXAMPLE 1

The city water of Atsugi city was treated by the following process while using the apparatus shown in FIG. 2. The TOC of the ultrapure water obtained is shown in Table 1.

City water→addition of reducing agent ($NaHSO_3$)→cation exchange tower→reaction vessel→anion exchange tower→decarbonation tower→cation exchange tower→anion exchange tower→reverse osmosis membrane unit→low pressure mercury ultraviolet oxidization unit→demineralization equipment→ultrafiltration membrane device→ultrapure water Since the water taken out of the cation exchange tower (packed with a H-type resin) had a pH of 3.0, no acid was added thereto. The amount of $H_2O_2$ added was 20 ppm and the catalytic thermal decomposition temperature was 170° C. As the catalyst, platinum held by a carrier was used.

The specification of each equipment used in Example 1 is as follows.

Cation exchange tower 2, 9a:
Diameter 50 mm×height 1000 mm
Packed with 1.25 l of "Diaion SKN-1", produced by Mitsubishi Kasei Corporation
Flow rate: 25 l/hour Anion exchange tower 8, 9b:
Diameter 50 mm×height 1000 mm
Packed with 1.25 l of "Diaion SAN-1", produced by Mitsubishi Kasei Corporation
Flow rate: 25 l/hour Decarbonation tower 7:
Diameter 50 mm×height 2500 mm
Capacity of the lower tank: 100 l
Provided with clean air blower Reverse osmosis membrane unit 9c:
Vessel: one vessel of diameter 50 mm×length 1200 mm
Element: one "NTR 729HFS2", produced by Nitto Electric Industrial Co., Ltd.
Water recovery: 80%
Permeate flow: 20 l/hour Low pressure mercury ultraviolet oxidization unit 9d:
One 80 W lamp, produced by Nihon Photoscience, Ltd.

Demineralization equipment 9e:
Diameter 50 mm×height 800 mm
Packed with a mixture of 0.15 l of a cation exchange resin gel and 0.35 l of an anion exchange resin gel
Flow rate: 20 l/hour Ultrafiltration membrane separation device 9f:
Vessel: one vessel of diameter 25 mm×length 500 mm
Element: one, external pressure type hollow fiber, fractional molecular weight: 80000
Water recovery: 95%
Permeate flow: 19 l/hour Comparative Example 1

The city water (TOC: 590 ppb) of Atsugi city was treated by the following process. The TOC of the ultrapure water obtained is shown in Table 1.

City water→ultrafiltration separation device→first reverse osmosis membrane unit→second reverse osmosis membrane nuit→demineralization equipment→low pressure mercury ultraviolet oxidization unit→demineralization equipment→ultrafiltration separation device→ulrtapure water The specification of each equipment used in Comparative Example 1 is as follows.

Ultrafiltration separation device:
Clarifier provided therein with a module having a flat polysulfone membrane spirally wound around a corrugated support plate First reverse osmosis membrane unit:
Vessel: one vessel of diameter 50 mm×length 1200 mm
Element: one "NTR 729HFS2", produced by Nitto Electric Industrial Co., Ltd.
Water recovery: 80%
Permeate flow: 21 l/hour Second reverse osmosis membrane unit:
Vessel, element: same as in the first reverse osmosis membrane unit
Water recovery: 95%
Permeate flow: 20 l/hour Demineralization equipment:
Diameter 50 mm×height 800 mm
Packed with a mixture of 0.15 l of a gel-type cation exchange resin and 0.35 l of gel type anion exchange resin
Flow rate: 20 l/hour Low pressure mercury ultraviolet oxidization unit:
One 80 W lamp, produced by Nihon Photoscience, Ltd.

Ultrafiltration membrane separation device:
Vessel: one vessel of diameter 25 mm×length 500 mm
Element: one, external pressure type hollow fiber, fractional molecular weight: 80000
Water recovery: 95%
Permeate flow: 19 l/hour

TABLE 1

| Example | TOC in ultrapure water (ppb) |
|---|---|
| Example 1 | 0.5 to 1.0 |
| Comparative Example 1 | 2.2 to 3.0 |

As is clear from Table 1, the TOC components other than urea in the raw water are efficiently decomposed and removed as well as urea, so that ultrapure water containing very low TOC is obtained by the method in Example 1.

Figure 3:
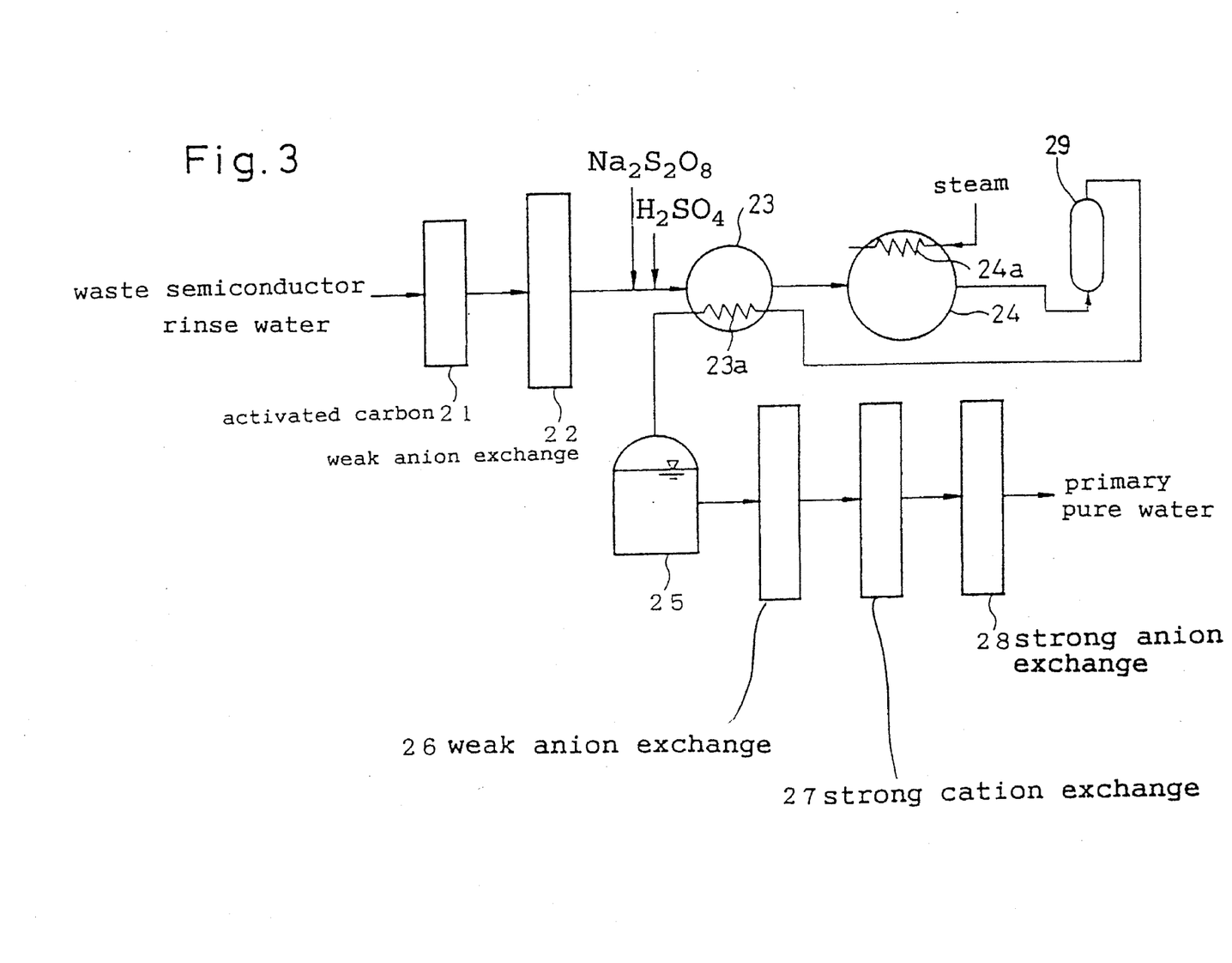
FIG. 3 is a flowchart of another embodiment of a method of producing primary pure water according to the present invention.

FIG. 3 is a flowchart of a primary pure water producing system for treating waste semiconductor rinse water so as to be used again as semiconductor rinse water.

After $H_2O_2$ and a surfactant are removed from waste semiconductor rinse water by an activated carbon adsorption column 21, hydrofluoric acid, hydrochloric acid, nitric acid, sulfuric acid, etc. are removed by a weak anion exchange tower 22. After $Na_2S_2O_8$ and $H_2SO_4$ are added to the water, it is heated by a first heat exchanger 23 and a second heat exchanger 24, and left in a reaction vessel 29 (without a catalyst) for 2 to 5 minutes.

By this operation, the TOC components in the waste semiconductor rinse water are decomposed and removed. The second heat exchanger 24 has a steam heater 24a as a heating source, while the first heat exchanger 23 has a hot water heater 23a as a heating source through which the hot treated water taken out of the second heat exchanger 24 is passed. The hot treated water taken out of the second heat exchanger 24 is passed through the hot water heater 23a and then introduced to a tank 25, a weak anion exchange tower 26, a strong cation exchange tower 27 and a strong anion exchange tower 28 so as to remove anions and cations. For example, $Na_2SO_4$, $H_2SO_4$, $CO_2$, unreacted $Na_2S_2O_8$, etc. are removed. It is possible that the weak anion exchange tower 26 is omitted and the water from the tank 25 is directly introduced to the strong cation exchange tower 27.

The system shown in FIG. 3 has the following advantages.

(1) The water recovery is high.

The water recovery is about 97%, which is about higher than the water recovery of a conventional system, which is about 89%.

(2) It is possible to immediately cope with a deterioration (increase in TOC) of the quality of raw water.

That is, when the quality of raw water is deteriorated, it is possible to increase TOC decomposition increasing the dosage of oxidizing agent.

(3) There is no operation trouble due to a contamination of the system by a slime produced by the propagation of bacteria.

Especially, bacteria can be completely killed by heating the water to a temperature of not lower than 120° C. by the second heat exchanger 14.

Example 2 and Examples 3 to 6 show examples of the operation of the apparatus system shown in FIG. 3.

The specification of each equipment used in Examples 2 to 6 is as follows.

Activated carbon column 21:

Diameter 50 mm×height 1500 mm

Packed with 2 l of "Kurarecoal GW 40/24", produced by Kurare Chemical Ltd.

Flow rate 20 l/hour

Weak anion exchange tower 22:

Diameter 50 mm×height 1000 mm

Packed with 1 l of "Diaion WA30", produced by Mitsubishi Kasei Corporation

Flow rate: 20 l/hour

Reaction vessel 29:

Hollow vessel of diameter 50 mm×height 900 mm (without oxidation catalyst)

Residence time: 5 min. (flow rate: 20 l/hour)

Weak anion exchange tower 26:

Diameter 50 mm×height 500 mm

Packed with 0.7 l of "Diaion WA30", produced by Mitsubishi Kasei Corporation

Flow rate: 20 l/hour

Strong cation exchange tower 27:

Diameter 50 mm×height 500 mm

Packed with 0.7 l of "Diaion SKN-1", produced by Mitsubishi Kasei Corporation

Flow rate: 20 l/hour

Strong anion exchange tower 28:

Diameter 50 mm×height 500 mm

Packed with 0.7 l of "Diaion SAN-1", produced by Mitsubishi Kasei Corporation

Flow rate: 20 l/hour

EXAMPLE 2

Properties of the raw water pH: 9.3

TOC: 2 ppm (1 ppm of isopropyl alcohol, 0.5 ppm of acetone and 0.5 ppm of methanol)

HF: 2 ppm

Temperature of the treated water in the second heat exchanger: 130° C.

Stay time of the treated water in the second heat exchanger: 2 min.

Amount of $Na_2S_2O_8$ added: 134 ppm ($Na_2S_2O_8$ concentration in the treated water)

Amount of $H_2SO_4$ added: 20 ppm) (pH of the treated water: 4.5)

As a result of purification, the treated water having a TOC concentration of 9 ppb was obtained, as shown in Table 2.

EXAMPLES 3 to 6

Waste semiconductor rinse water was treated in the same way as in Example 2 except that the temperature of the treated water in the second heat exchanger 24 was changed to 110° C., 130° C., 140° C. or 150° C., respectively. The TOC concentrations of the treated water are shown in Table 2.

TABLE 2

| Temperature of the second heat exchanger (°C.) | TOC (ppb) |
|---|---|
| Example 3 | 110 | 25 |
| Example 2 | 120 | 9 |
| Example 4 | 130 | 3 |
| Example 5 | 140 | 3 |
| Example 6 | 150 | 3 |

As is clear from Table 2, it is possible to greatly lower the TOC concentration by heating the treated water to not lower than 120° C. after adding $Na_2S_2O_8$.

Figure 4:
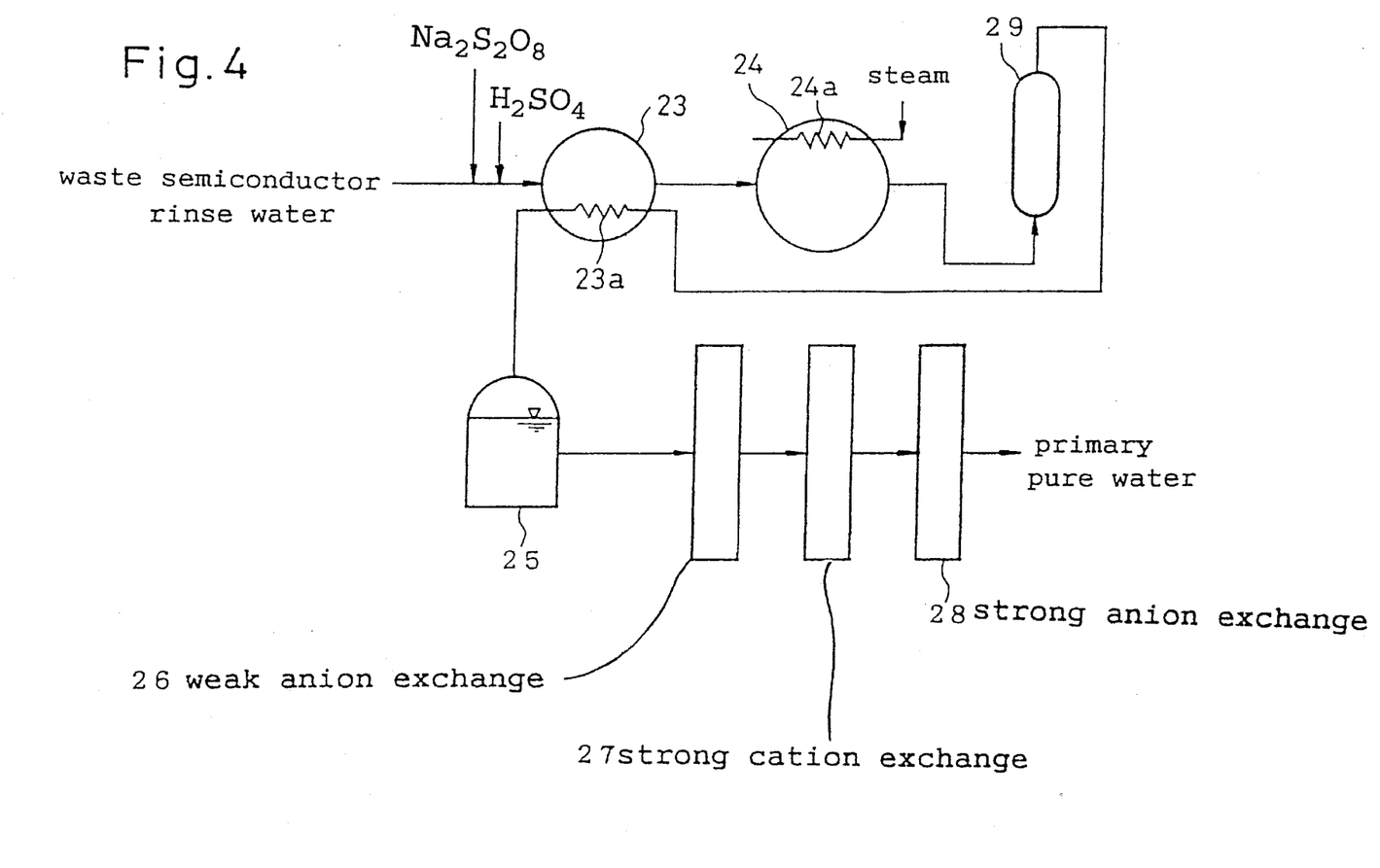
FIG. 4 is a flowchart of still another embodiment of a method of producing primary pure water according to the present invention.

FIG. 4 is a flowchart of the same system as that shown in FIG. 3 except that the activated carbon column and the first weak anion exchange tower 22 were omitted.

In this system, $Na_2S_2O_8$ was directly added to raw water, but other process was the same in the system shown in FIG. 3.

The weak anion exchange tower 26 is provided in order to enhance the regeneration efficiency by a regenerant (NaOH) in the ion exchange tower, but it may be omitted.

A reverse osmosis membrane unit may be used in place of the ion exchange tower 26, 27 and 28.

The system shown in FIG. 4 has the following advantages.

(1) It is possible to completely prevent the generation of slime and contamination by slime.

(2) The treatment flow is simple and the maintenance is easy.

(3) The water recovery of the apparatus as a whole is as high as about 97%. About 3% of water is lost as the regenerating water for ion exchange.

(4) It is possible to cope with a change in the quality (TOC) of the raw water only by changing the dosage of oxidizing agent. The increase or decrease in the amount of ion by the change in the dosage of oxidizing agent is dealt with by changing the time of supplying water to the ion exchange towers.

EXAMPLE 7

Example 7 shows an example of the operation of the system shown in FIG. 4. The specification of each equipment used in the operation is the same as that in Example 2.

Properties of the raw water pH: 3

TOC: 3 ppm (1 ppm of isopropyl alcohol, 0.25 ppm of acetone, 0.25 ppm of methanol and 1 ppm of surfactant)

$H_2O_2$: 20 ppm

Temperature of the treated water in the reaction vessel: 130° C.

Residence time of the treated water in the reaction vessel: 5 min.

Dosage of $Na_2S_2O_8$: 180 ppm ($Na_2S_2O_8$ concentration in the treated water)

As a result of purification, the treated water having a TOC concentration of 2 ppb and a resistivity of 13 MΩcm was obtained. The TOC concentration of the water introduced from the reaction vessel 29 to the tank 25 was 3 ppb.

Figure 5:
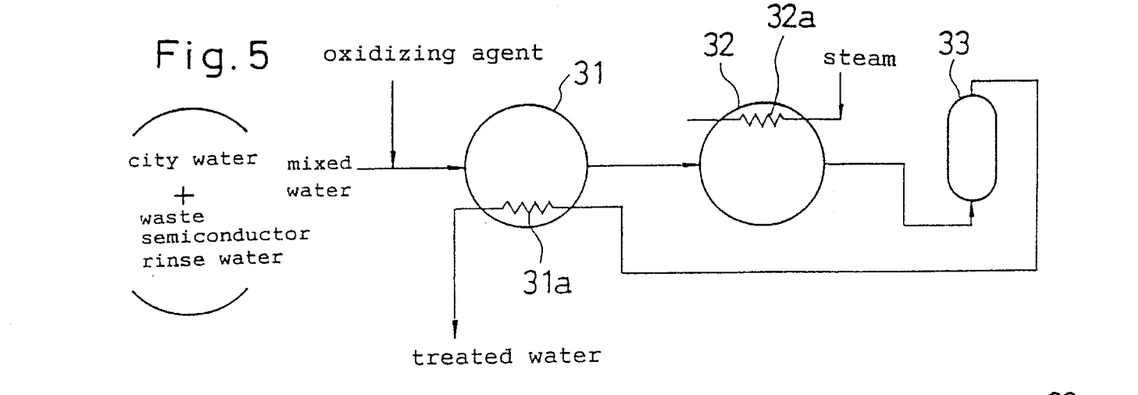
FIG. 5 is a flowchart of an embodiment of a method of producing water having a low TOC concentration according to the present invention.

FIG. 5 is a flowchart of a system for producing water having a low TOC concentration by treating mixed water of city water and waste semiconductor rinse water.

An oxidizing agent (persulfate) is added to the mixed water, and after the mixed water is heated by a first heat exchanger 31 and a second heat exchanger 32, it is passed through a reaction vessel 33 having no catalyst. The second heat exchanger 32 has a steam heater 32a as a heating source, while the first heat exchanger 31 has a hot water heater 31a as a heating source through which the hot treated water taken out of the reaction vessel 33 is passed.

Figure 6:
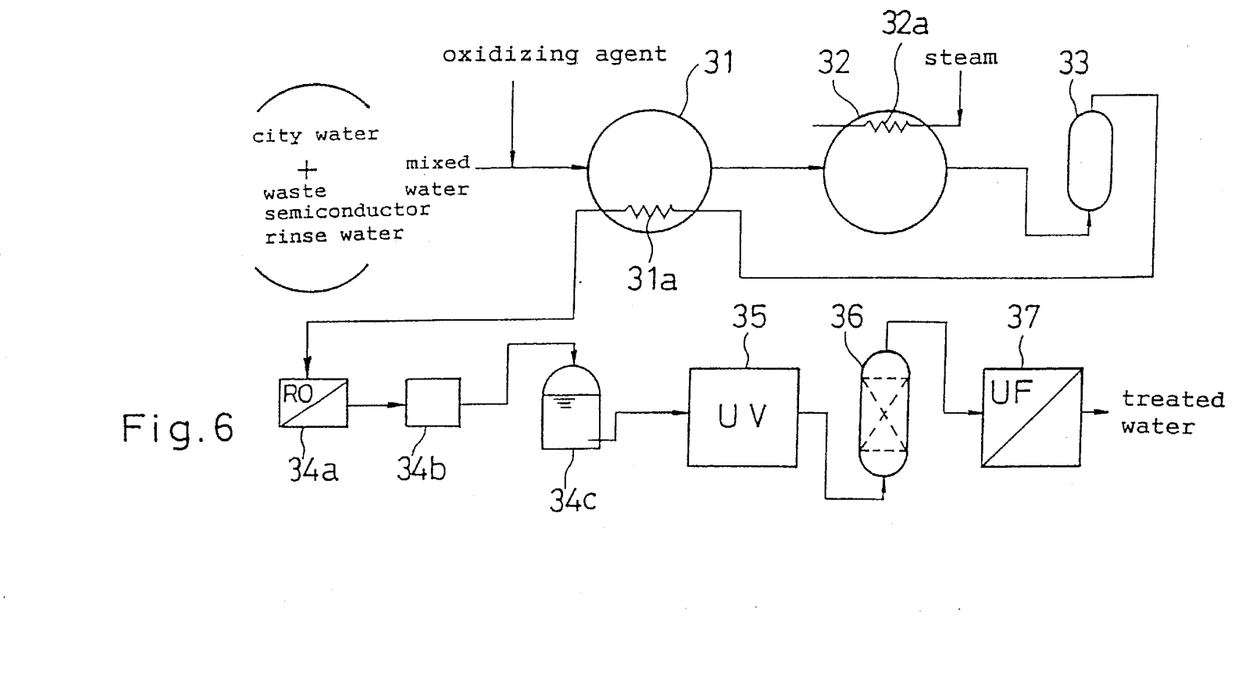
FIG. 6 is a flowchart of another embodiment of a method of producing ultrapure water according to the present invention.

FIG. 6 shows a system for producing ultrapure water by further purifying the water treated by the apparatus shown in FIG. 5.

The treated water taken out of a reaction vessel 33 is heat-exchanged by the heater 31a of the first heat exchanger 31 so as to be cooled approximately to an ordinary temperature. The treated water is supplied to a reverse osmosis membrane unit (RO) 34a and demineralization equipment 34b to obtain primary pure water, which is stored in a tank 34c. The primary pure water is then introduced to a low-pressure mercury ultraviolet oxidization unit (UV) 35, a mixed bed ion exchange column 36 and an ultrafiltration membrane device (UF) 37, thereby producing ultrapure water. The demineralization equipment 34b is preferably a mixed bed ion exchange tower or a two-column system (a strong cation exchange tower and a strong anion exchange tower arranged in series).

As the mixed bed ion exchange column 36, a nonregeneration-type ion exchanger is preferable.

EXAMPLE 8

Example 8 shows an example of the operation of the system shown in FIG. 6. The specification of each equipment used in the operation is as follows.

Reaction vessel 33:

Hollow vessel of diameter 50 mm×height 900 mm (without oxidation catalyst)

Residence time: 4 min. (flow rate: 25 l/hour)

Reverse osmosis membrane unit 34a:

Vessel: one vessel of diameter 50 mm×length 1200 mm

Element: one "NTR 729HFS2", produced by Nitto Electric Industrial Co., Ltd.

Water recovery: 80%

Permeate flow: 20 l/hour

Demineralization equipment 34b:

Mixed bed anion exchange tower Diameter 50 mm×height 1000 mm Packed with a mixture of 0.35 l of a gel type cation exchange resin and 0.65 l of gel type anion exchange resin Flow rate: 20 l/hour Low pressure mercury ultraviolet oxidization unit 35: 80 W lamp, produced by Nihon Photoscience, Ltd.

Mixed bed ion exchange column 36:

Diameter 25 mm×height 800 mm

Packed with a mixture of 0.15 l of a gel type cation exchange resin gel and 0.35 l of gel type anion exchange resin Flow rate: 20 l/hour ultrafiltration membrane unit 37:

Vessel: one vessel of diameter 50 mm×length 500 mm

Element: one, external pressure type hollow fiber, fractional molecular weight: 80000

Permeate flow: 19 l/hour

Properties of the water being treated (city water of Atsugi city, Kanagawa, Japan mixed with waste semiconductor rinse water at the ratio of 1:1)

| | |
|---|---|
| pH: 5 | |
| TOC: 1.5 ppm | |
| (isopropyl alcohol | 40% |
| surfactant | 10% |
| acetone | 10% |
| methanol | 10% |
| organic matter in the city water | 30% |

Operating conditions

Temperature of the water in the reaction vessel: 130° C. stay time of the treated water in the reaction vessel: 4 min.

Oxidizing agent: $K_2S_2O_8$

Dosage of oxidizing agent: 130 ppm ($K_2S_2O_8$ concentration in the treated water)

Dosage of sulfuric acid: 38 ppm (pH of the treated water: 3)

The quality of the treated water is shown in Table 3.

TABLE 3

| Water sampling point | TOC (ppb) | Resistivity (MΩ cm) |
|---|---|---|
| Exit of reaction vessel 33 | 3 | Not measured |
| Exit of mixed bed ion exchange column 36 | 4 | 12.0 |
| Exit of UF 37 | 1 | 18.2 |

It is clear from Table 3 that treated water having a very low TOC concentration is obtained by the apparatus shown in FIG. 6.

Figure 7:
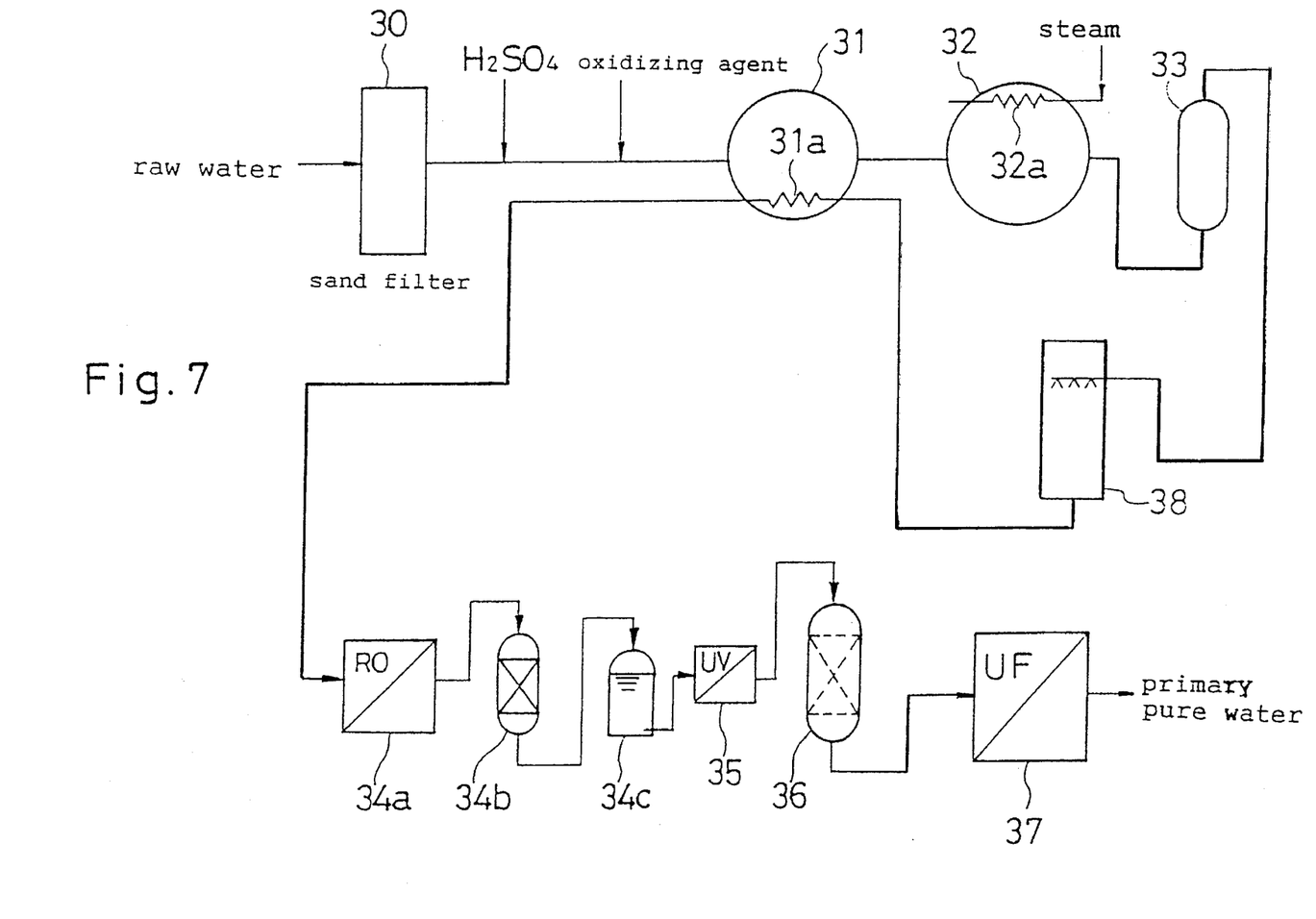
FIG. 7 is a flowchart of still another embodiment of a method of producing ultrapure water according to the present invention.

FIG. 7 is a flowchart of the system which can decompose TOC by heating and remove the dissolved oxygen. The same reference numerals are provided for the elements which are the same as those shown in FIG. 6.

Raw water is filtered through a sand filter 30 and thereafter sulfuric acid is added so as to adjust the pH of the water to 2 to 4, preferably about 3. After a sulfate (preferably $Na_2S_2O_8$) is added, the water is heated to 120° to 50° C., preferably about 130° C. by the heat exchangers 31, 32, and the organic matter is decomposed by the reaction vessel 33. Thereafter, the water is degassed at a high temperature by a degas tower 38 and cooled by the heat exchanger 31. In order to decompose the unreacted sulfate, a reducing agent such as $NaSO_4$ is added, and a caustic alkali such as NaOH is then added so as to adjust the pH to 4 to 6, preferably about 5.5. After the water is treated by the reverse osmosis membrane unit (preferably provided with a PA membrane) 34a, it is treated by the mix bed ion exchange tower 34b, thereby obtaining primary pure water. The primary pure water is stored in the tank 34c, and then introduced to the low-pressure mercury ultraviolet oxidization unit 35, the mixed bed ion exchange column 36 and the ultrafiltration membrane device (UF) 37, thereby producing ultrapure water.

The system shown in FIG. 7 has the following advantages.

(1) Raw water is filtered through the sand filter 30, which is simpler than coagulation floatation and filtration.

(2) Since the water treated by thermal decomposition is deaerated by the degas tower, degas at a high temperature is possible without further heating and, as a result, pure water containing not more than 1 ppb of dissolved oxygen is obtained.

(3) Since an organic matter is thermally decomposed, the reverse osmosis membrane unit 34a is sufficient to be provided at only one stage.

(4) Since the TOC components are sufficiently thermally decomposed, pure water containing not more than 2 ppb of TOC is obtained. In addition, the contamination of the membrane of the reverse osmosis membrane unit by an organic matter is greatly reduced.

EXAMPLE 9

Example 9 shows an example of the operation of the system shown in FIG. 7. The specification of each equipment used in Example 9 is as follows.

Sand filter 30:
Diameter 25 mm×height 3000 mm
Flow rate: 25 l/hour
Reaction vessel 33:
Diameter 50 mm×height 900 mm (without oxidation catalyst)
Stay time: 4 min.
Flow rate: 25 l/hour
Degas tower 38 :
Diameter 50 mm×height 5000 mm
Reverse osmosis membrane unit 34a:
Vessel: one vessel of diameter 50 mm×length 1200 mm
Element: one "NTR 729HFS2", prepared by Nitto Electric Industrial Co., Ltd.
Water recovery: 80%
Permeate flow: 20 l/hour
Mixed bed ion exchange tower 34b:
Diameter 50 mm×height 1000 mm
Packed with a mixture of 0.35 l of a gel type cation exchange resin and 0.65 l of gel type anion exchange resin
Flow rate: 20 l/hour
Low pressure mercury ultraviolet oxidization unit 35:
80 W lamp, produced by Nihon Photo science, Ltd.
Mixed bed ion exchange column 36:
Diameter 25 mm×height 800 mm
Packed with a mixture of 0.15 l of a gel type cation exchange resin gel and 0.65 l of gel type anion exchange resin
Flow rate: 20 l/hour
Ultrafiltration membrane device 37:
Vessel: one vessel of diameter 50 mm×length 500 mm
Element: one, external pressure type hollow fiber, fractional molecular weight: 80000
Permeate flow: 19 l/hour
The operating conditions are as follows.
Raw water: city water of Atsugi city, Kanagawa, (TOC 800 ppb, electric conductivity 190 μS/cm, free chlorine 0.7 ppm as $Cl_2$)

pH of the water after adding sulfuric acid: 3 Desage of $K_2S_2O_8$: 60 ppm
($K_2S_2O_8$ concentration in the treated water)
Heating temperature: 130° C.
Degas temperature: 130° C.
The quality of the treated water is shown in Table 4.

Comparative Example 2

For the purpose of comparison, the city water of Atsugi city was treated by activated carbon, and sulfuric acid was added thereto so as to adjust the pH to 5.5. The thus-treated water was passed through a two-stage reverse osmosis membrane equipment, and a mixed bed ion exchange tower. The water was then degased, thereby obtaining primary pure water.

The specification of each equipment used in the operation is as follows.

Activated carbon column:
Diameter 50 mm×height 1000 mm
Packed with 1.2 l of "Kurarecoal GW 40/24", prepared by Kurare Chemical Ltd.
Flow rate 24 l/hour
Two-stage reverse osmosis membrane equipment:
Vessel: two vessels of diameter 50 mm×length 1200 mm
Element: two "NTR 729HFS2", prepared by Nitto Electric Industrial Co., Ltd connected in series
Permeate flow at the second stage: 20 l/hour
Mixed bed ion exchange tower:
Diameter 50 mm×height 1000 mm
Packed with a mixture of 0.35 l of a gel type cation exchange resin gel and 0.65 l of gel type anion exchange resin
Flow rate: 20 l/hour
Vacuum degas tower:
Diameter 50 mm×height 13 m Degree of vacuum in the tower: 24 mmHg abs. (25° C.)

The primary pure water was treated by the nonregeneration-type ion exchange resin and the UF membrane device after being oxidized by UV in the same way as in Example 8, thereby producing ultrapure water.

The qualities of the primary pure water and the ultrapure water are shown in Table 4.

It is clear from Table 4 that it is possible to produce pure water having very low TOC concentration and dissolved oxygen concentration in Example 9.

TABLE 4

| | | TOC (ppb) | Dissolved oxygen (ppb) | Remarks |
|---|---|---|---|---|
| Example 9 | Primary pure water | 2 | Not more than 1 | Invention |
| | Ultrapure water | 1 | Not more than 1 | |
| Comparative Example 2 | Primary pure water | 10 | 12 | Comparison |
| | Ultrapure water | 3 | 13 | |

Figure 8:
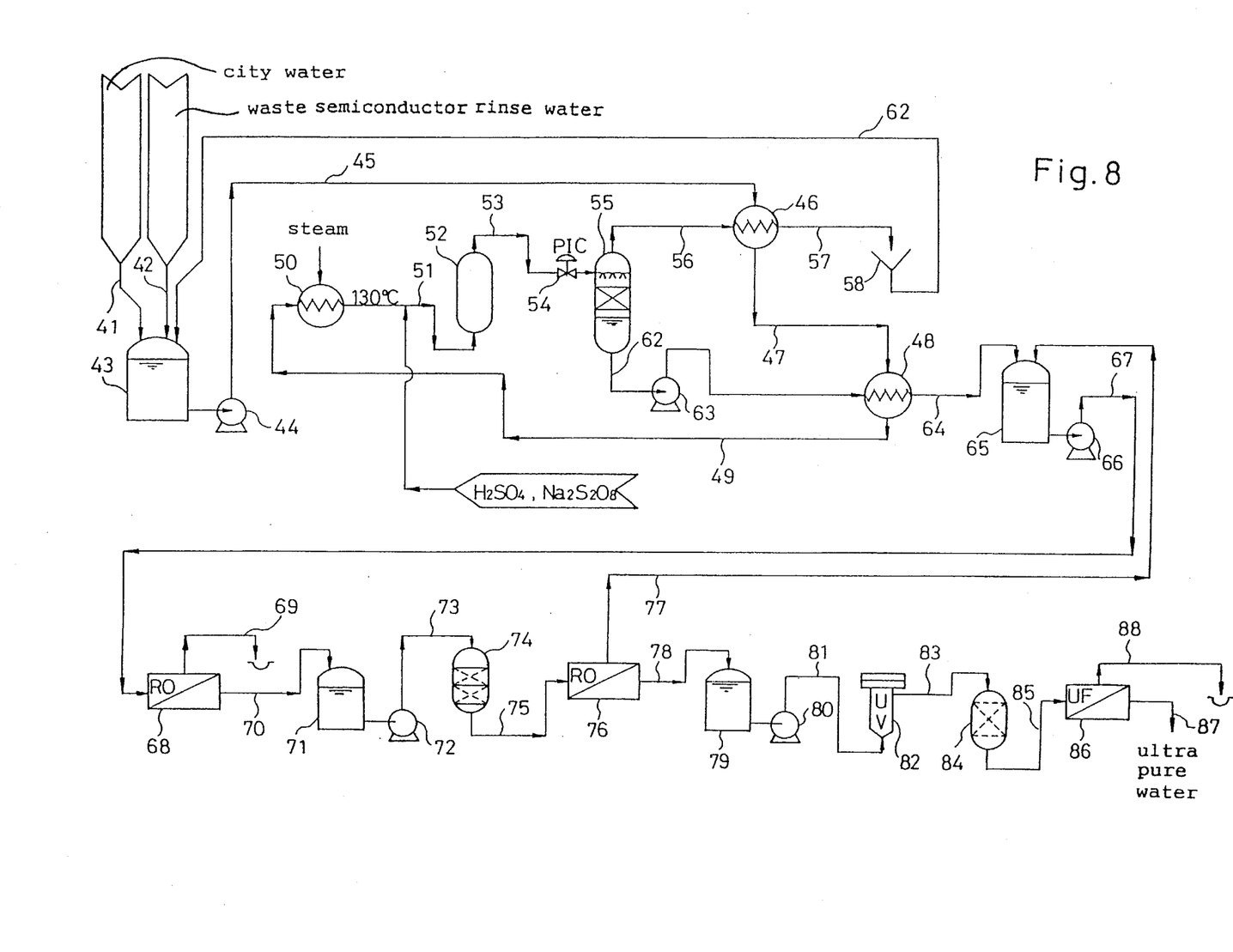
FIG. 8 is a flowchart of a preferred system used the present invention.

FIG. 8 is a flowchart of a preferred system used in the present invention.

Water such as city water or industrial water is supplied from a pipe 41 to a raw water tank 43. Waste semiconductor rinse water is introduced form a pipe 42 to the raw water tank 43.

The raw water in the raw water tank 43 is introduced to a first heat exchanger 46 through a raw water pump 44 and a pipe 45 and heated. The heated water is supplied to a second heat exchanger 48 through a pipe 47 so as to be further heated.

The water heated by the heat exchanger 48 is introduced to a third heat exchanger 50 through a pipe 49. The third heat exchanger 50 uses a steam heater as a heating source, and the water is heated to 130° C.

$H_2SO_4$ and $Na_2S_2O_8$ are added to the heated water, which is introduced to a reaction vessel 52 through a pipe 51. The reaction vessel 52 is a hollow vessel, but it may be packed with a catalyst, if necessary. In the reaction vessel 52, the organic matter contained in the raw water is sufficiently decomposed. The decomposed water is introduced to a high-temperature degas tower 55 through a pipe 53 and a pressure control valve 54.

A condensed water collector 58 is connected to the upper portion of the high-temperature degas tower 55 through pipes 56, 57. The pipe 56 is connected to a pipe on the heating source fluid side of the first heat exchanger 46, and the gas extracted from the high-temperature degas tower 55 is passed through the pipe on the beating source fluid side of the first heat exchanger 46 so as to be heat-exchanged with the raw water which is introduced from the pipe 45. The heat-exchanged gas is condensed, collected by the condensate water collector 58, and returned to the raw water tank 43.

The water degassed by the high-temperature degas tower 55 is drawn out from the bottom portion of the tower 55 through a pipe 62 and a pump 63, and introduced to a pipe on the heating source fluid side of the second heat exchanger 48. After the water is heat-exchanged, it is introduced to a tank 65 through a pipe 64, and temporarily stored therein.

The water in the tank 65 is introduced to a reverse osmosis membrane unit 68 through a pump 66 and a pipe 67 so as to be subjected to reverse osmosis treatment. The concentrated water of the unit 68 is taken out through a pipe 69 and disposed. The permeated water from the unit 68 is introduced to a tank 71 through a pipe 70, and further to a mixed bed ion exchange tower 74 through a pump 72 and a pipe 73. The demineralized water is introduced to a loose reverse osmosis membrane unit (or ultrafiltration membrane unit) 76 through a pipe 75. The loose reverse osmosis membrane unit. 76 is provided with a reverse osmosis membrane having a low salt removable rate such as 30 to 50%. The concentrated water from the loose reverse osmosis membrane unit 76 is returned to the tank 65 through a pipe 77.

The permeated water from the unit 76 is primary pure water, and is introduced to a primary pure water tank 79 through a pipe 78.

The primary pure water is introduced to a low-pressure mercury ultraviolet oxidization unit 82 through a pump 80 and a pipe 81 so as to be irradiated with ultraviolet. The water is then introduced to a nonregeneration-type ion exchange column 84 through a pipe 83, and further to an ultrafiltration membrane device 86 through a pipe 85. The permeated water from the device 86 is supplied to a usepoint through a pipe 87 as ultrapure water. The excess ultrapure water is returned from the device 86 to the primary pure water tank 79. The concentrated water from the device 86 is discharged out through a pie 88.

In the system shown in FIG. 8, a reverse osmosis membrane unit may be used in place of the mix bed ion exchange column 74. In addition, the reverse osmosis unit 68 and the mix bed ion exchange tower 74 may be changed with each other.

Furthermore, a two-tower demineralization equipment which is composed of a cation exchange tower and an anion exchange tower connected in series may be used in place of the mixed bed ion exchange tower 74.

In the above example, waste semiconductor rinse water is introduced with dirty water or industrial water to the raw water tank 43, but only either of them may be introduced.

City water contains components for hardness such as calcium and magnesium ions, while waste semiconductor rinse water contains fluoride ions. Consequently, if city water and waste semiconductor rinse water are mixed with each other as they are, insoluble compounds such as $CaF_2$ are produced. It is therefore preferable to remove the components for hardness by bringing the city water into contact with a strong acidic cation exchange resin or to remove fluoride ions by bringing the waste semiconductor rinse water into contact with an anion exchange resin (e.g., a weak basic anion exchange resin having a good regeneration efficiency) before the city water and the waste semiconductor rinse water are mixed with each other. Both pretreatments may be adopted. Alternatively, after the city water is mixed with the waste semiconductor rinse water without any pretreatment, the insoluble compounds produced may be filtered out.

Although the reaction vessel 52 in the example is not packed with any catalyst, it may be packed with a catalyst.

Industrial Applicability

As described above, according to the method of producing pure water of the present invention, it is possible to produce ultrapure water which has greatly reduced TOC and a very high degree of purity from raw water such as city water, well water and industrial water. According to the present invention, it is possible to reduce the dissolved oxygen in pure water. In addition, according to the present invention, the system is simplified.

We claim:

1. A method of producing pure water, comprising:

contacting raw water containing hydrofluoric acid and TOC components with a weak basic anion exchange resin to remove fluoride ions from the raw water, making the raw water acidic so that pH is not more than 4.5, and heating the raw water in a presence of an oxidizing agent to decompose the TOC components, and deionizing the raw water.

2. A method of producing pure water according to claim 1, wherein after the fluoride ions are removed, said making and heating steps comprise adding the oxidizing agent and an acid to the raw water, and then heating the raw water.

3. A method of producing pure water according to claim 1, wherein said raw water contains hydrogen peroxide, and a persulfate is added to said raw water prior to thermal decomposition of said TOC components in the raw water.

4. A method of producing pure water according to claim 1, wherein after thermal decomposition of said TOC components in the raw water, the raw water is first degassed at a high temperature, and then deionized.

5. A method of producing pure water according to one of claim 1, wherein thermal decomposition of said TOC components in the raw water is conducted at 110° to 170° C. for 2 to 5 minutes.

6. A method of producing pure water according to claim 5, wherein the temperature for said thermal decomposition is 130° to 150° C.

* * * * *